US009351028B2

(12) United States Patent
Sheth et al.

(10) Patent No.: US 9,351,028 B2
(45) Date of Patent: May 24, 2016

(54) WIRELESS 3D STREAMING SERVER

(75) Inventors: Soham V. Sheth, San Diego, CA (US); Vijayalakshmi R. Raveendran, San Diego, CA (US); Judit Martinez Bauza, San Diego, CA (US); PhaniKumar K. Bhamidipati, San Diego, CA (US); Xun Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1014 days.

(21) Appl. No.: 13/182,645

(22) Filed: Jul. 14, 2011

(65) Prior Publication Data

US 2013/0019024 A1    Jan. 17, 2013

(51) Int. Cl.
*G06F 15/16* (2006.01)
*H04N 21/41* (2011.01)
*H04N 21/2381* (2011.01)
*H04N 21/435* (2011.01)
*H04N 21/83* (2011.01)
*H04N 13/00* (2006.01)

(52) U.S. Cl.
CPC ....... *H04N 21/4122* (2013.01); *H04N 13/0029* (2013.01); *H04N 13/0059* (2013.01); *H04N 13/0066* (2013.01); *H04N 21/2381* (2013.01); *H04N 21/4358* (2013.01); *H04N 21/83* (2013.01); *H04N 2013/0081* (2013.01); *H04N 2213/003* (2013.01)

(58) Field of Classification Search
CPC .......... H04N 21/2381; H04N 21/4122; H04N 21/4358; H04N 21/83; H04N 13/0059; H04N 13/0066; H04N 13/0029; H04N 2013/0081; H04N 2213/003

USPC ......................................................... 709/231
See application file for complete search history.

(56) References Cited

U.S. PATENT DOCUMENTS

| | | | | |
|---|---|---|---|---|
| 6,104,837 A | * | 8/2000 | Walker | 382/239 |
| 6,111,979 A | * | 8/2000 | Katto | 382/154 |
| 6,377,257 B1 | * | 4/2002 | Borrel et al. | 345/419 |

(Continued)

FOREIGN PATENT DOCUMENTS

| | | |
|---|---|---|
| EP | 1677474 A1 | 7/2006 |
| JP | 2000078611 A | 3/2000 |

(Continued)

OTHER PUBLICATIONS

Fehn C: "Depth-image-based rendering (DIBR), compression, and transmission for a new approach on 3D-TV" Proceedings of the International Society for Optical Engineering (SPIE),SPIE, USA LNKD—DOI:10.1117/12.524762, vol. 5291, May 31, 2004, pp. 93-104, XP002444222 ISSN: 0277-786X p. 96.

(Continued)

*Primary Examiner* — Jerry Dennison
(74) *Attorney, Agent, or Firm* — Shyam K. Parekh

(57) ABSTRACT

An apparatus, system, method, and computer program product for streaming 3D content from a wireless device to a remote 3D display for the viewing of the 3D content on a larger screen. In some aspects, a wireless streaming server may encode 3D motion picture content in a certain format, where each image frame includes a 2D view concatenated side-by-side with a complementary frame of depth information. The combination of the 2D view and the depth information are capable of being processed by a client display to generate a stereoscopic image representing a 3D view.

62 Claims, 9 Drawing Sheets

(56) References Cited

U.S. PATENT DOCUMENTS

| | | | |
|---|---|---|---|
| 6,956,566 B2 | 10/2005 | Gelb | |
| 7,028,025 B2* | 4/2006 | Collins | |
| 7,054,478 B2* | 5/2006 | Harman | 382/154 |
| 7,173,635 B2 | 2/2007 | Amann et al. | |
| 7,245,768 B1* | 7/2007 | Harman et al. | 382/232 |
| 7,551,770 B2* | 6/2009 | Harman | 382/154 |
| 7,894,633 B1* | 2/2011 | Harman | 382/106 |
| 8,099,389 B2* | 1/2012 | Collins | 707/636 |
| 8,427,525 B2* | 4/2013 | Funabiki et al. | 348/43 |
| 8,543,642 B2* | 9/2013 | Corbett et al. | 709/203 |
| 8,553,028 B1* | 10/2013 | Urbach | 345/419 |
| 2001/0054060 A1* | 12/2001 | Fillebrown | G06F 1/1626 709/201 |
| 2002/0029285 A1* | 3/2002 | Collins | 709/232 |
| 2002/0035596 A1* | 3/2002 | Yang et al. | 709/203 |
| 2003/0195979 A1* | 10/2003 | Park | 709/231 |
| 2004/0032488 A1* | 2/2004 | Harman | 348/51 |
| 2004/0032980 A1* | 2/2004 | Harman | G06T 7/0022 382/154 |
| 2004/0193675 A1* | 9/2004 | Fillebrown | G06F 1/1626 709/203 |
| 2005/0169174 A1* | 8/2005 | Apostolopoulos et al. | 370/230 |
| 2008/0010676 A1* | 1/2008 | Dosa Racz et al. | 726/11 |
| 2009/0027391 A1* | 1/2009 | Burley et al. | 345/426 |
| 2010/0007717 A1* | 1/2010 | Spektor | G06F 3/005 348/43 |
| 2010/0063994 A1 | 3/2010 | Cook et al. | |
| 2010/0182402 A1 | 7/2010 | Nakajima et al. | |
| 2010/0191859 A1 | 7/2010 | Raveendran | |
| 2010/0261424 A1 | 10/2010 | Mittal et al. | |
| 2010/0309287 A1* | 12/2010 | Rodriguez | H04N 13/0059 348/43 |
| 2010/0310155 A1* | 12/2010 | Newton | H04N 13/0055 382/154 |
| 2011/0032329 A1 | 2/2011 | Bauza et al. | |
| 2011/0141237 A1* | 6/2011 | Cheng et al. | 348/46 |
| 2011/0149049 A1* | 6/2011 | Sasaki | H04N 19/187 348/51 |
| 2011/0310235 A1* | 12/2011 | Sasaki | H04N 13/0029 348/54 |
| 2015/0049806 A1* | 2/2015 | Choi | H04N 19/597 375/240.12 |

FOREIGN PATENT DOCUMENTS

| | | |
|---|---|---|
| KR | 20050087876 A | 8/2005 |
| KR | 20070079328 A | 8/2007 |
| WO | WO-0078611 A2 | 12/2000 |
| WO | WO-03100727 A2 | 12/2003 |
| WO | 2004045230 A1 | 5/2004 |
| WO | WO-2011017473 A1 | 2/2011 |
| WO | WO-2011050304 A2 | 4/2011 |

OTHER PUBLICATIONS

Handley, M. et al., "SDP: Session Description Protocol" Network Working Group, Request for Comments: 2327, Category: Standards Track. ISI/LBNL, Apr. 1998, pp. 1-42.

Schulzrinne, et al., "Real Time Streaming Protocol (RTSP)" Network Working Group, Request for Comments: 2326, Apr. 1998, pp. 1-92.

Schulzrinne, et al., "RTP: A Transport Protocol for Real-Time Applications," Network Working Group RFC 3550, Jul. 2003, 105 pp.

International Search Report and Written Opinion—PCT/US2012/046806—ISA/EPO—Oct. 31, 2012.

Merkle P, et al., "Video plus depth compression for mobile 3D services" 3DTV Conference: The True Vision-Capture, Transmission and Display of 3D Video, 2009, IEEE, Piscataway, NJ, USA, May 4, 2009, pp. 1-4, XP031471558 ISBN: 978-1-4244-4317-8 the whole document.

Schierl T., et al., "Transport and Storage Systems for 3-D Video Using MPEG-2 Systems, RTP, and ISO File Format", Proceedings of the IEEE, IEEE. New York, us, vol . 99, No. 4, Apr. 1, 2011, pp. 671-683, XP011363622, ISSN: 0018-9219, DOI: 10.1109/JPROC.2010.2091370.

"Text of ISO/IEC FDIS 23002-3 Representation of Auxiliary Video and Supplemental Information", 79. MPEG Meeting; Jan. 15, 2007-Jan. 19, 2007; Marrakech; (Motion Pictureexpert Group or ISO/IEC JTC1/SC29/WG11), No. N8768, Apr. 20, 2007, XP030015262, ISSN: 0000-0132.

* cited by examiner

WIRELESS 3D STREAMING SERVER

BACKGROUND

1. Field

The present disclosure relates generally to wireless communications, and more particularly, to the wireless streaming of 3D images.

2. Background 3D motion pictures are becoming increasingly popular, and as a result, the availability of 3D content is rapidly increasing. Many viewers of traditional 2D content may wish to convert that content into 3D content. Further, many users of mobile devices such as wireless user equipment (UE) may wish to carry this content with them, so that the 3D content can be enjoyed on the go, and shared with colleagues, friends, family, and business partners.

However, if 3D content is stored on a UE, the UE typically includes a very small display screen, making the viewing of 3D movies on the UE less enjoyable for a user. Further, there are very few phones currently available that have a 3D display or support 3D rendering.

Thus, there is a push in the field for a continued improvement in user experience and mobility relating to 3D content.

SUMMARY

Some aspects of the present disclosure provide an efficient way for user equipment (UE) to stream 3D content to a remote 3D display for the viewing of the 3D movie on a larger screen. Thus, the UE becomes a wireless 3D streaming server, and the remote display becomes a client for the 3D motion picture.

In one aspect of the disclosure, the streaming server may encode the 3D motion picture content in a certain format, where each image frame includes a 2D view concatenated side-by-side with a complementary frame of depth information. The combination of the 2D view and the depth information are capable of being processed by a client display to generate a stereoscopic image representing a 3D view.

The concatenated frame including the side-by-side 2D view and depth information may be wirelessly streamed from the streaming server to the client. Utilizing the encoding described above, the required bandwidth for streaming is reduced relative to the streaming of stereoscopic images, since the depth information may be considered as a monochromatic image, where the depth associated with each pixel is represented by a single number.

A feature of this format is that the depth information may simply be truncated, and a 2D image may be displayed. For example, in a legacy 2D client display, the depth information may be ignored.

Another feature is that the wireless streaming server (the UE) can display the 2D movie corresponding to half of the concatenated frame on its local display at the same time as the remote client 3D display is displaying the 3D image.

In another aspect of the disclosure, the concatenated frame including the side-by-side format may be encoded utilizing an extension to the Session Description Protocol (SDP). In this way, backwards compatibility with SDP-compliant legacy devices can be maintained, as they would be unaware that the depth information part of the frames was even there, and would display the 2D image part normally.

In another aspect of the disclosure, the SDP is further extended to provide an indication that the streaming content is actually 3D content. Thus, an additional information element is included in the SDP stream to indicate that the stream is 3D.

In an aspect of the disclosure, a method of streaming media content from a streaming server includes providing three-dimensional (3D) media content at the streaming server, establishing a streaming session between the streaming server and a streaming client, and transmitting the media content to the streaming client over the streaming session, for remote rendering and display of a 3D image.

In another aspect of the disclosure, a streaming server includes a file parser configured to extract 3D media content from a content source, a multimedia messaging services module configured to establish a streaming session with a streaming client, and a wireless transmitter configured to stream the 3D media content to the streaming client over the streaming session.

In another aspect of the disclosure, a method of wireless communication includes receiving media content from a streaming server over a wireless streaming session, the media content comprising a two-dimensional (2D) image and a corresponding depth map, synthesizing a three-dimensional (3D) image based on the 2D image and the depth map, and rendering the 3D image on a display.

In another aspect of the disclosure, a streaming client includes a wireless receiver configured to receive a stream comprising three-dimensional (3D) media content from a streaming server, the 3D media content including a two-dimensional (2D) image and a corresponding depth map; a 3D filter for separating the 2D image from the corresponding depth map; a depth image based rendering (DIBR) module for generating a stereoscopic image based on the 2D image and the corresponding depth map; and a display driver for rendering the stereoscopic image on a display.

In another aspect of the disclosure, an apparatus for streaming media content from a streaming server includes means for providing three-dimensional (3D) media content at the streaming server, means for establishing a streaming session between the streaming server and a streaming client, and means for transmitting the media content to the streaming client over the streaming session, for remote rendering and display of a 3D image.

In another aspect of the disclosure, an apparatus for wireless communication includes means for receiving media content from a streaming server over a wireless streaming session, the media content comprising a two-dimensional (2D) image and a corresponding depth map, means for synthesizing a three-dimensional (3D) image based on the 2D image and the depth map, and means for rendering the 3D image on a display.

In another aspect of the disclosure, a computer program product includes a computer-readable medium having code for providing three-dimensional (3D) media content at a streaming server, code for establishing a streaming session between the streaming server and a streaming client, and code for transmitting the media content to the streaming client over the streaming session, for remote rendering and display of a 3D image.

In another aspect of the disclosure, a computer program product includes a computer-readable medium having code for receiving media content from a streaming server over a wireless streaming session, the media content comprising a two-dimensional (2D) image and a corresponding depth map, code for synthesizing a three-dimensional (3D) image based on the 2D image and the depth map, and code for rendering the 3D image on a display.

In another aspect of the disclosure, an apparatus for streaming media content from a streaming server includes a processor and a memory coupled to the processor, wherein the processor is configured to provide three-dimensional (3D)

media content at the streaming server, to establish a streaming session between the streaming server and a streaming client, and to transmit the media content to the streaming client over the streaming session, for remote rendering and display of a 3D image.

In another aspect of the disclosure, an apparatus for wireless communication includes a processor and a memory coupled to the processor, wherein the processor is configured to receive media content from a streaming server over a wireless streaming session, the media content comprising a two-dimensional (2D) image and a corresponding depth map, to synthesize a three-dimensional (3D) image based on the 2D image and the depth map, and to render the 3D image on a display.

DETAILED DESCRIPTION

Figure 1:
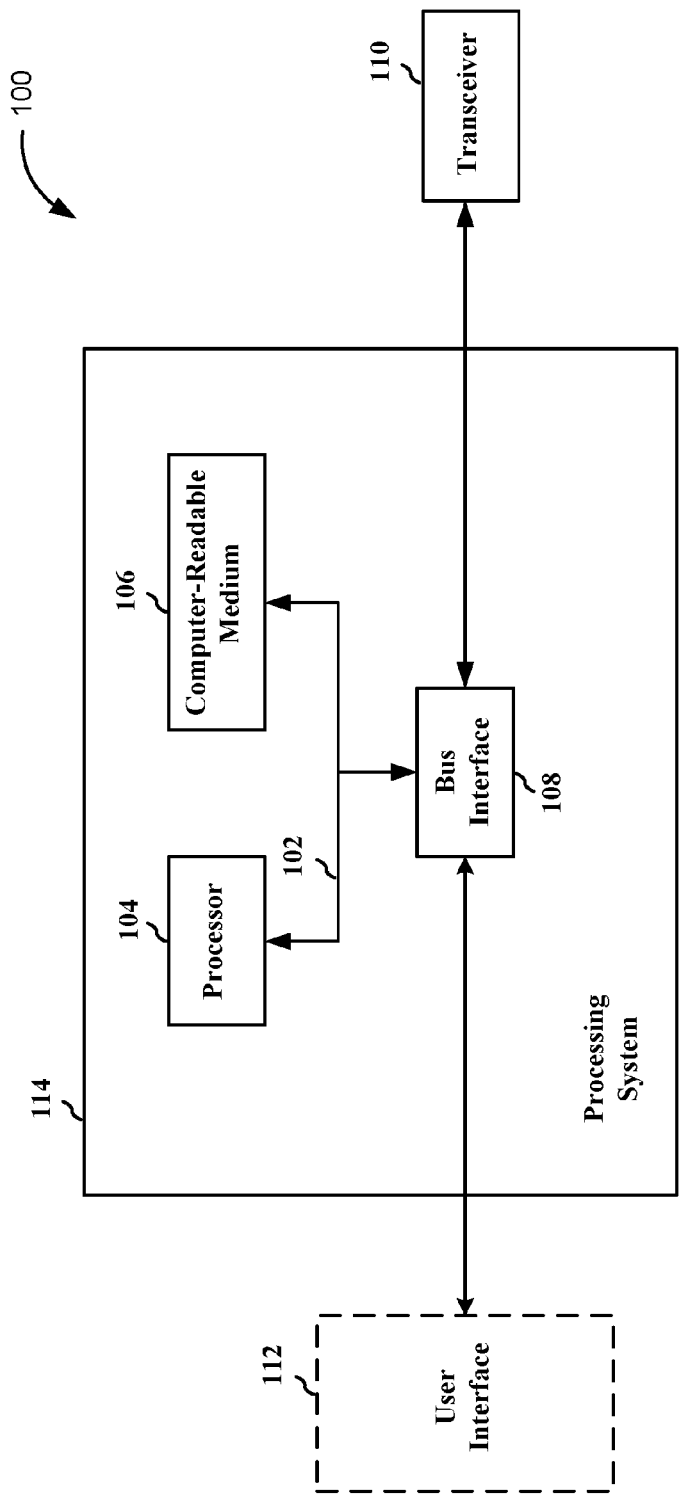
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

In the present disclosure, two-dimensional (2D) and three-dimensional (3D) images are extensively discussed. Here, images may refer to single still images, or a plurality of images adapted to be viewed in sequence as a motion picture.

Synthesis of 3D images from originally 2D content may generally take place using one of two alternatives. First, the synthesized 3D content may include a 2D view concatenated with a corresponding depth map. Second, the synthesized 3D content may include two views, i.e., a stereoscopic image with a left view and a right view. Stereoscopic content may be processed to generate the concatenated 2D+depth map images.

The various aspects of the present disclosure discussed below apply to both alternatives for synthesized 3D content, or any other suitable option for synthesized 3D content. Although the specific implementation detailed below emphasizes the first option, i.e., a 2D view and a corresponding depth map, with small changes that a person having ordinary skill in the art can easily implement, 3D streaming utilizing stereoscopic images can be realized.

In a synthesized 3D stream, the 2D image may be concatenated side-by-side or top-to-bottom with the depth information, and the concatenated frames may together be compressed and/or encoded for transmission. On the other hand, the 2D image and the corresponding depth map may be provided as two compressed files or two streams, e.g., within a single container file for transmission. In a system having suitable processing capabilities, on-the-fly variants of these approaches may be used. Of course, to reduce the processing resources needed for the encoder, and to reduce the bandwidth needed for transmission of the stream, a motion picture may be encoded at a reduced frame rate.

Providing the 3D images as the concatenated 2D+depth frames, and encoding the frames together to be stored within a single container file (e.g., an MP4 file) may reduce the need to synchronize stereoscopic bitstreams. Further, even in the case of errors in transmission, it may be easier to re-synchronize the stream when utilizing the 2D+depth frames. Moreover, when a user stores the 2D+depth information in the concatenated frames, there may be no need to keep track of pairing between the 2D image and the corresponding depth information, and that single file can be utilized for 3D playback as well as 2D playback by simply truncating the depth information. However, concatenating the information together may provide limited control over the bit rate allocation between the 2D image and the depth map.

Figure 2A:
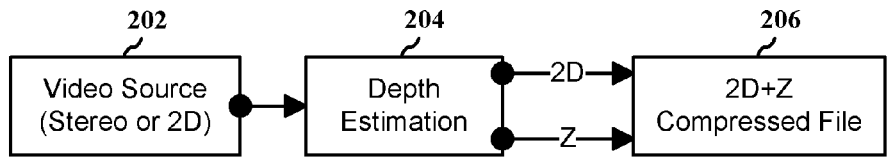
FIGS. 2A-2C are simplified block diagrams illustrating exemplary apparatuses for generating a concatenated 2D+depth file, streaming the concatenated 2D+depth file, and receiving and displaying the concatenated 2D+depth file as a 3D image, respectively.

FIG. 2A is a simplified block diagram of an apparatus for synthesizing a file that contains a 2D image and a depth map concatenated together (e.g., side-by-side), in accordance with some aspects of the disclosure. As shown in FIG. 2, a video source 302 may provide 2D or stereoscopic images to a depth estimator 304. Here, the depth estimator 304 may generate a depth estimation (Z) from the 2D or 3D image(s). This depth estimation may then be concatenated side-by-side with the 2D image (or one of the two views in the case of a stereoscopic video source) into a single compressed file by block 306. Here, the compressed file may be generated utilizing a standards-compliant container format, such as MP4 so that conventional software and hardware components may be utilized to play and stream the content of this file with few if any changes. For example, changes to a conventional device might include identifying the file as a 2D+depth source.

In some aspects of the disclosure, this processing may be done on the mobile device, or may be exported to be performed on another system. Further, this processing may be done offline, i.e., prior to the streaming of the content, or may be performed in real-time or on the fly.

Figure 3:
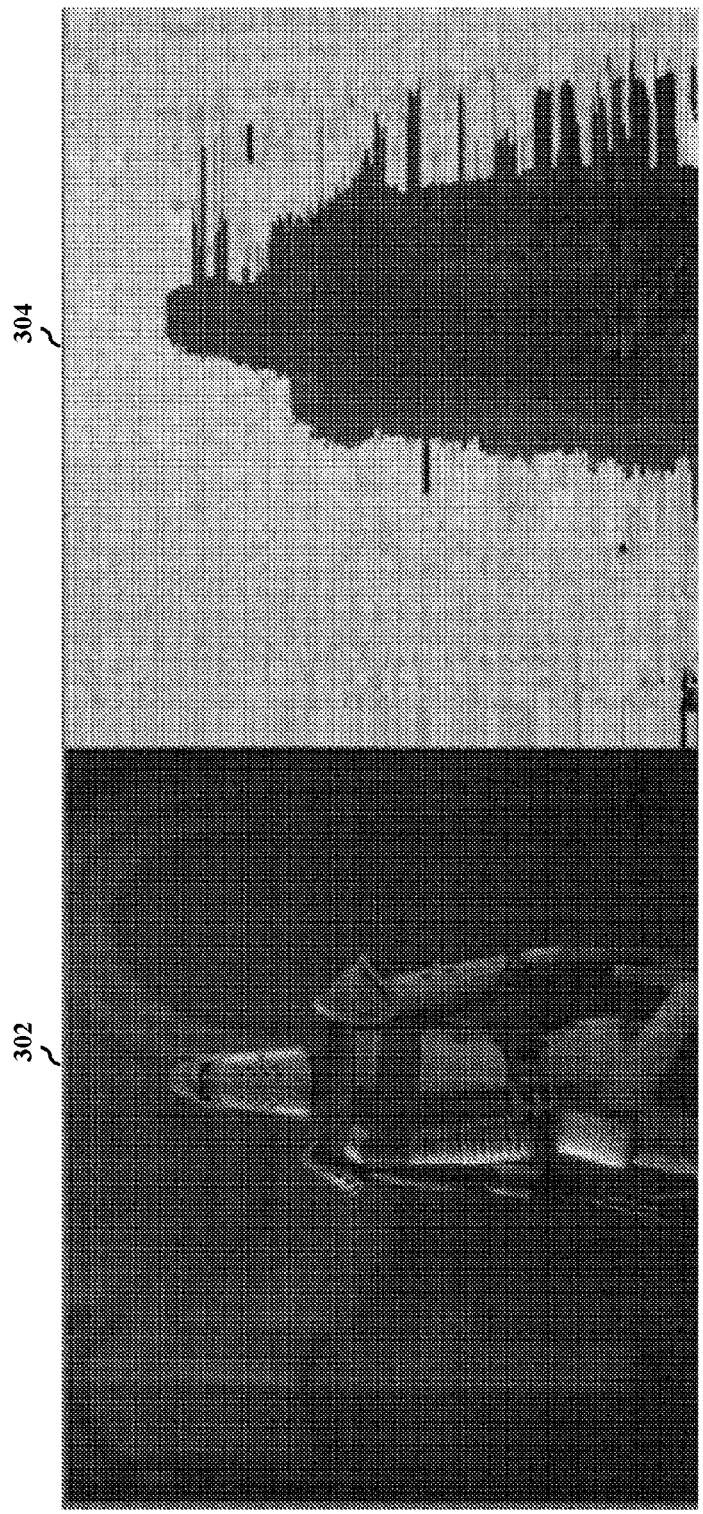
FIG. 3 is a diagram illustrating one example of a concatenated 2D+depth frame in accordance with an aspect of the disclosure.

FIG. 3 is an illustration of a concatenated 2D+depth image frame as it might be generated by the apparatus of FIG. 2A. In the illustrated example, the image on the left-hand side 302 is a 2D image, while the image on the right-hand side 304 is a depth map corresponding to the 2D image. The depth information includes monochromatic grayscale values. In this respect, suitable compression settings should be utilized for compression of the frame for optimal efficiency. For example, if utilizing a compliant H.264 encoder, the concatenated frame may be encoded by restricting the modes for the depth map to be Intra only, and the depth map may be encoded utilizing a lower QP value to increase its quality.

Figure 2B:
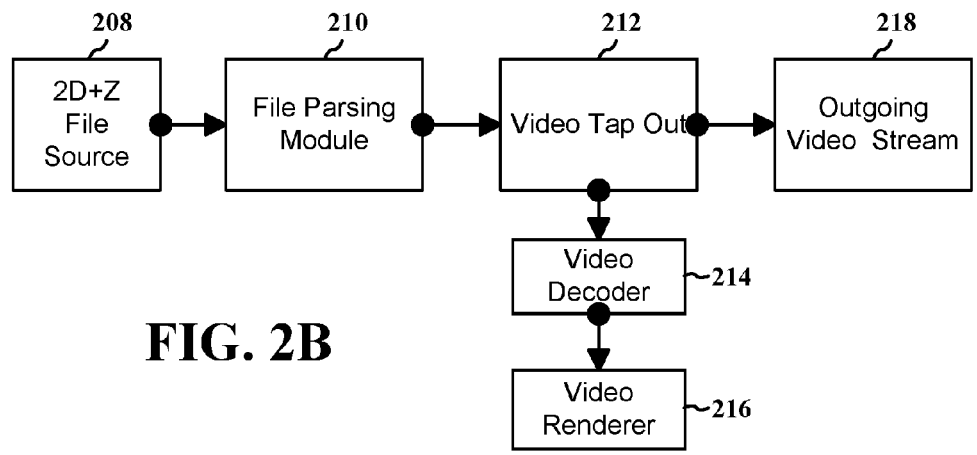

A mobile device may be utilized as a streaming source (e.g., a server) for streaming the content to a remote client having a 3D display, or a larger display than that available on the mobile device. FIG. 2B is a simplified block diagram of a streaming server for streaming the 2D+Z content in accordance with some aspects of the disclosure. Block 208 is a 2D+Z file source, which may be the 2D+Z compressed file generated by block 206 in FIG. 2A. The 2D+Z file source 208 may provide the 2D+Z file to a file parser 210. Here, the file parser 210 may extract the media and meta-data from the compressed file. A video tap-out block 212 may pass the parsed content to an outgoing video stream block 218, to be streamed to a remote client utilizing a suitable communication interface. Further, the video tap-out block 212 may pass the parsed content to a local video decoder 214, which may locally decode the video and provide the decoded content to a video renderer 216. Thus, the video renderer 216 may render the video content to be displayed on a local display. In some aspects of the disclosure, the local decoding, rendering, and display of the video content may be omitted or disabled.

Based on information stored in the file, the streaming server may transmit an indication about the format of the content (e.g., the content being 2D+Z, and in a side-by-side format) to the remote client device. For example, the indication may be provided to the client utilizing a Session Description Protocol (SDP).

In SDP, each media source is generally described as a "track." Attributes of the track, compulsory or optional, may be described in the SDP attribute lines. When streaming 2D+Z content, in one aspect of the disclosure, the streaming server may add an optional attribute to the SDP description. Here, because a media player with a 2D display may ignore optional attributes, that media player would not regard the concatenated frame as any different than a conventional 2D frame. However, for a 3D-compliant player that understands the 2D+Z format, this attribute can be parsed such that the client can determine that the content is in the 2D+Z format and embark upon further processing (e.g., decoding and rendering).

Figure 2C:
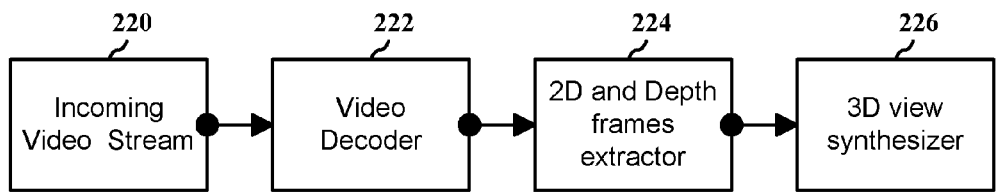

FIG. 2C is a simplified block diagram illustrating a streaming client for receiving the 2D+Z stream and displaying the 3D content in accordance with some aspects of the disclosure. Block 220 represents the incoming video stream, which may be provided by the outgoing video stream block 218 from the streaming server illustrated in FIG. 2B. The incoming video stream 220 may include the concatenated 2D+Z content and corresponding metadata that describes the content as being in the 2D+Z format. The incoming video stream 220 may be provided to a video decoder 222, which may thereby decode the incoming stream and pass the decoded stream to a 2D+depth frame extractor 224. The frame extractor 224 may separate the 2D and the depth frames, and may thereby pass the separated frames to a 3D view synthesizer 226, which utilizes the depth and 2D information to produce a 3D image.

In an aspect of the disclosure, synthesis of the 3D image based on the extracted 2D and depth frames may be based on depth image based rendering (DIBR). Here, a virtual view is generated by modeling the setup as a shift-sensor stereo pair with the same camera parameters, and projecting the points of the 2D image onto the plane defined by the virtual view according to the model and the depth of the points. Additional details of DIBR are known to those skilled in the art, and are omitted from the instant disclosure.

As described above, in another aspect of the disclosure, rather than utilizing the concatenated 2D+Z format, a 2D image and its corresponding depth map may be provided as a pair of two compressed and/or encoded files or two streams. In some examples, the two files may be provided within a single container file (e.g., an MP4 container file) for transmission.

Encoding the 2D image and the depth map separately may provide increased flexibility and efficiency. Here, the 2D image portion may be encoded utilizing standard H.264 encoding options, since the image sequence is similar to any conventional video clip. As for the depth map, the encoding settings may be appropriately modified to take advantage of the fact that it may only contain grayscale values. Some of these encoder settings include increasing the QP value for the chroma component of the depth map, and inserting an Intra (I) frame at regular intervals. Those having ordinary skill in the art will comprehend additional settings to optimize the encoding of the depth map. Further, encoding the 2D image and the depth map separately may provide improved rate control to meet potential network bandwidth restrictions, and in the case of errors or complete loss of the depth map stream, it is relatively simple to fall back to 2D playback. However, although simple, unlike the concatenated frames, the separate 2D image and the depth map files may require synchronization for proper playback of the 3D video. Further, some form of identification mechanism may be required to identify the corresponding depth map for a given 2D image file.

Figure 4A:
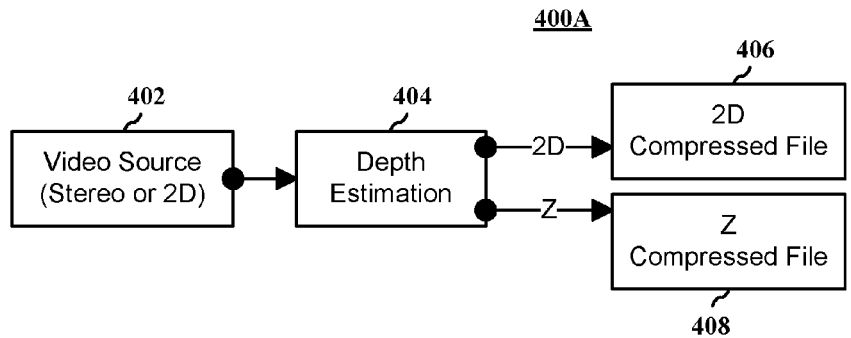
FIGS. 4A-4C are simplified block diagrams illustrating exemplary apparatuses for generating separate 2D+depth files, streaming the separate 2D+depth files, and receiving the separate 2D+depth files and displaying a 3D image, respectively.

FIG. 4A is a simplified block diagram of an apparatus 400A for synthesizing two files that respectively contain a 2D image and a depth map, in accordance with some aspects of the disclosure. Here, a 2D or 3D video source 402 provides video information to a depth estimation block 404, which thereby produces a depth map from the respective video and generates two separate files, i.e., a 2D file 406 and a depth (Z) file 408. The 2D file 406 and the Z file 408 may be compressed files. A suitable mechanism for pairing the respective 2D file 406 and Z file 408 may be utilized, e.g., utilizing a naming convention to relate the corresponding files, or embedding pairing information into the file itself. In an aspect of the disclosure, the 2D file 406 and the Z file 408 may be stored in one container, e.g., by storing the different video objects in an MP4 container file. In another aspect of the disclosure, the 2D file 406 and the Z file 408 may be stored in separate file containers with an association between the two by way of file names or object IDs as described above.

Figure 4B:
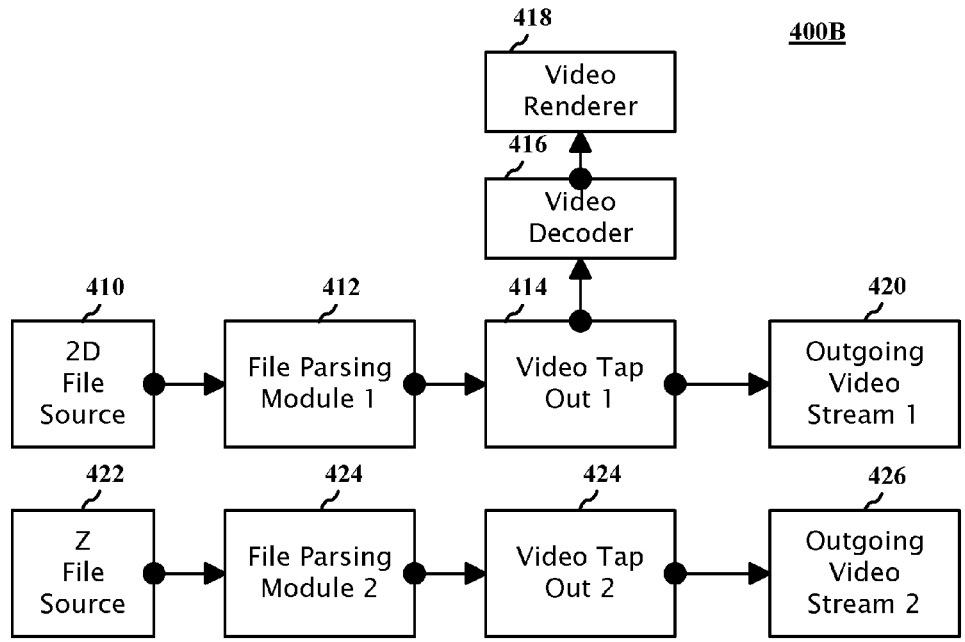

FIG. 4B is a simplified block diagram of a streaming server 400B for streaming the 2D image file and the depth map file in accordance with some aspects of the disclosure. Utilizing this approach the streaming server may establish two parallel processes: one for processing the file with the 2D content, and another for processing the depth (Z) content. Further the streaming server may notify the requesting client about the respective video streams to be sent. Here, the 2D file source 410 may be the 2D file 406 output by the 2D+Z synthesis illustrated in FIG. 4A. Further, the Z file source 422 may be the Z file 408 output by the 2D+Z synthesis illustrated in FIG. 4A. The 2D file from the 2D file source 410 is input into a first file parsing module 412 to parse the 2D content stored in the 2D file and pass the parsed 2D content to the first video tap-out block 414. Similarly, the Z file from the Z file source 422 is input into a second file parsing module 424 to parse the depth content stored in the Z file and pass the parsed depth content to a second video tap-out block 424. If the local display in the streaming server supports 2D video display, then the first video tap-out block 414 may branch the content and send it to a local video decoder 416 for decoding the parsed 2D video content. The video decoder 416 may then pass the decoded video content to a video renderer 418 for rendering and displaying the 2D video content. If the local display in the streaming server supports 3D video display, then the second tap-out block 424 may similarly branch the depth content for local 3D decoding and rendering (not illustrated). The video tap-out blocks 414 and 424 may correspondingly forward the respective parsed content to the outgoing video streaming modules 420 and 426, which may then transmit the respective video streams to the remote client.

In a further aspect of the disclosure, corresponding or associated 2D+Z data (e.g., associated through frame number or sequence number fields) may be streamed on different real-time transport protocol (RTP) ports of the same real time streaming protocol (RTSP) session. In another aspect, the path for the 2D file may be initialized first, and depending on whether the client requests it, the path for the Z file may follow.

Figure 4C:
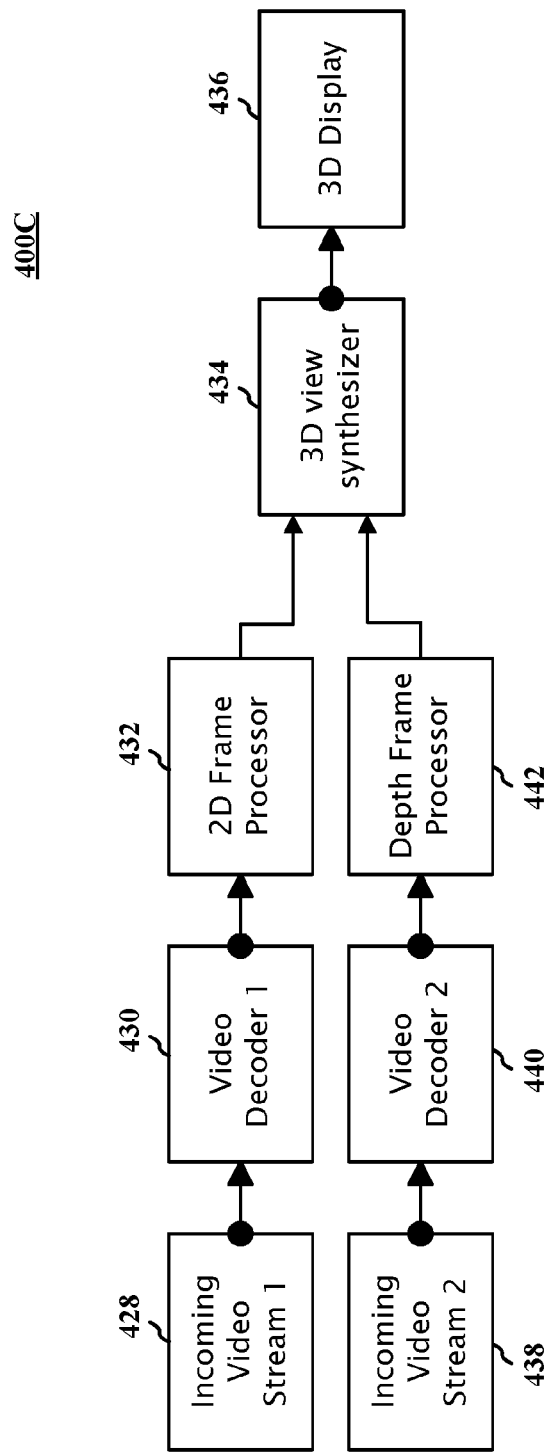

FIG. 4C is a simplified block diagram illustrating a streaming client for receiving the 2D image stream and the depth stream and displaying the 3D content in accordance with some aspects of the disclosure. Here, upon receiving the first incoming video stream 428 including the 2D image stream, and the second incoming video stream 438 including the depth stream, the respective video streams are input into a first video decoder 430 for decoding the 2D image stream and a second video decoder 440 for decoding the depth stream. The respective decoded frames are provided to a 2D frame processor 432 and depth frame processor 442, which process the respective decoded frames and synchronize the respective 2D and depth frames to pass them to a 3D view synthesizer 434 for generating a 3D view. The 3D view synthesizer 434 then generates the 3D view and sends it to a 3D display 436 for displaying the 3D view.

In another implementation in accordance with some aspects of the disclosure, a single container file that contains the two video streams (i.e., one for the 2D content and the other for the Z content) is streamed from the streaming server to the streaming client. Here, at the streaming server, a single parser module feeds the two video streams, which are thereby sent to the streaming client.

Figure 5:
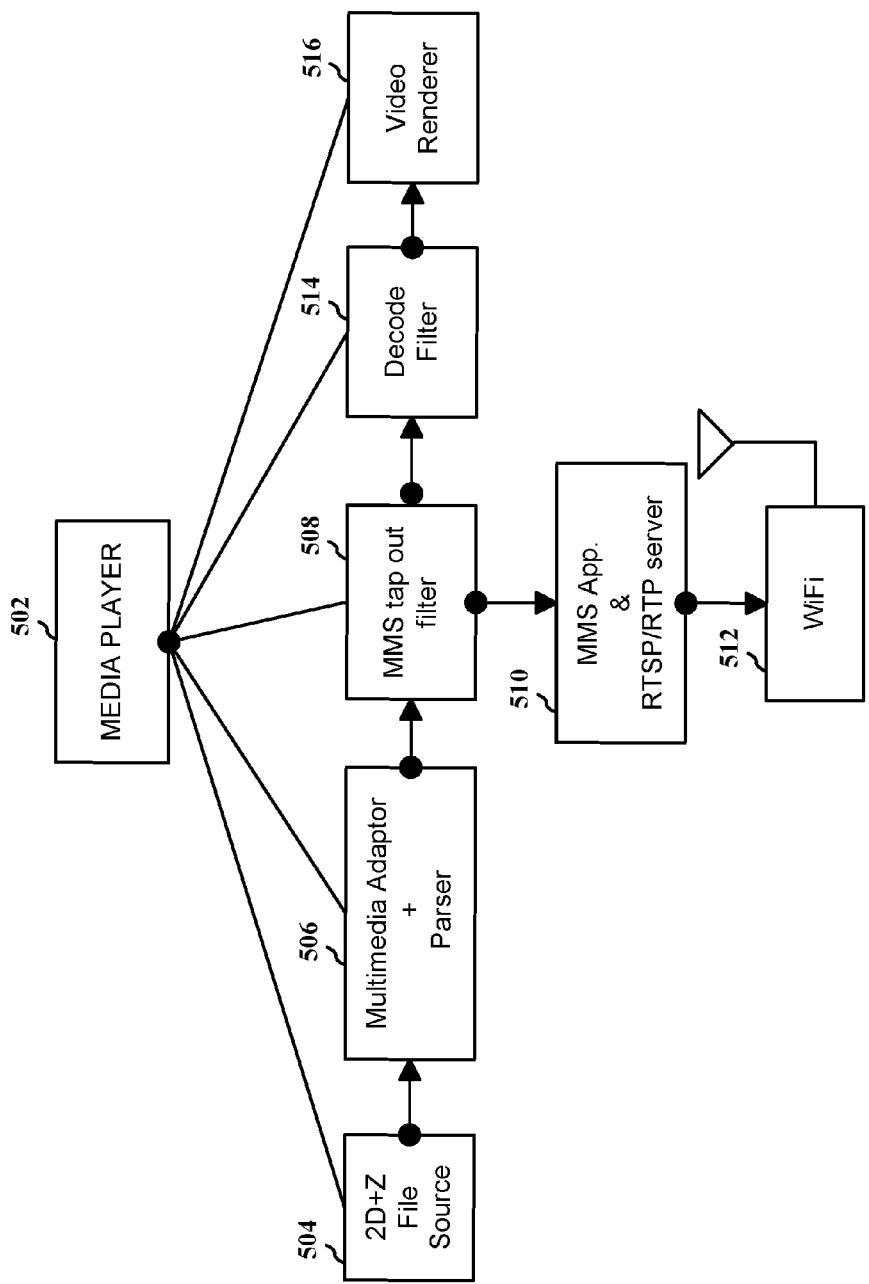
FIG. 5 is a block diagram illustrating further details of a particular implementation of a streaming server in accordance with an aspect of the disclosure.

Returning to FIG. 2B, illustrating a streaming server for streaming concatenated 2D+Z content, FIG. 5 is a block diagram illustrating further details of a particular implementation of a streaming server in accordance with an aspect of the disclosure. That is, the illustrated example shows an implementation utilizing a Microsoft Windows Media Player 502 utilizing a DirectShow multimedia framework. In the illustrated example and the associated discussion below, it is assumed that the streamed content is the same content being locally played back on the streaming server. However, in an aspect of the disclosure, a user may select any content available to the streaming server for streaming, independent of the content being locally played.

In FIG. 5, a media player application 502 is in communication with a media path including a 2D+Z file source 504, a multimedia adapter and parser 506, a tap-out filter 508, a decode filter 514, and a video renderer 516. In one example, a user of the streaming server may invoke the media player 502 to play a file that includes 2D+Z content (e.g., from 2D+Z file source 504). The media player 502 may then build a DirectShow filter graph utilizing various filter components, as illustrated. The parser 506 may extract the meta-data information from the 2D+Z content, and pass the meta-data to a tap-out filter 508, which may branch the meta-data to a multimedia messaging services (MMS) application 510. Here, the MMS application 510 may enable the streaming server to act as an RTSP streaming server. That is, when an RTSP session is established between a remote streaming client and the streaming server, the MMS application 510 may send the collected meta-data information as an SDP description to a Wi-Fi module 512 which may then transmit the information to the streaming client. This description may include the indication that the content to be streamed includes 2D+Z image content, so that the streaming client may process the stream as a 3D stream. For example, the indication may be included by providing an additional field in SDP indicating that the content includes 2D+Z content. For example, the indication may be included in the SDP description as:

a=DepthZ:0x280,0x1E0

The parser 506 may further extract the video and audio content from the 2D+Z file, and forward the video content to the tap-out filter 508. The tap-out filter 508 may further provide the parsed 2D+Z content to the RTP server 510, which is thereby provided to the Wi-Fi transceiver 512 to be streamed to the streaming client. The tap-out filter 508 may further provide the parsed information to a decode filter 514. When the content additionally includes audio information, this audio content may be correspondingly forwarded to a respective audio decode filter (not illustrated) as a parallel stream. The video renderer 516 may then render the decoded content from the decode filter 514 to be rendered locally on the streaming server.

Figure 6:
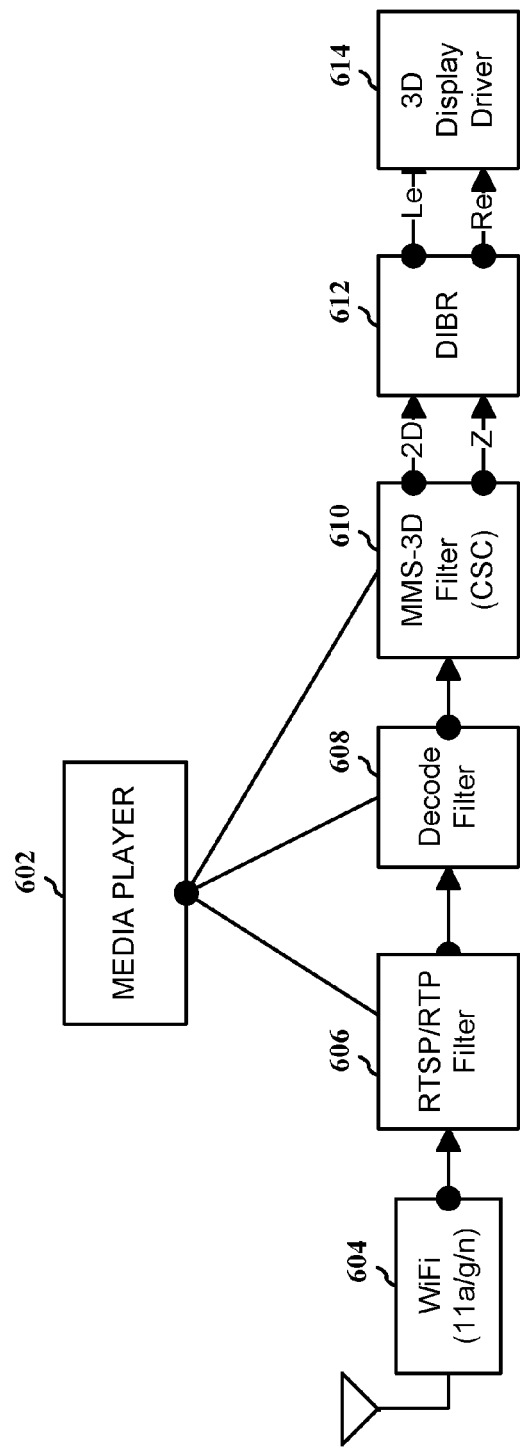
FIG. 6 is a block diagram illustrating further details of a particular implementation of a streaming client in accordance with an aspect of the disclosure.

Returning now to FIG. 2C, which illustrates a streaming client for receiving the 2D+Z stream and displaying the 3D content, FIG. 6 is a block diagram illustrating further details of a particular implementation of a streaming client in accordance with an aspect of the disclosure. That is, the illustrated example shows an implementation utilizing a Microsoft Windows Media Player 602 utilizing a DirectShow multimedia framework.

In FIG. 6, a media player application 602 establishes a filter graph to receive and process received 2D+Z content, the filter graph including an RTSP/RTP filter 606, a decode filter 608, and an MMS-3D filter (CSC) 610. The streaming server further includes a Wi-Fi module 602, a depth information based rendering (DIBR) module 612, and a 3D Display Driver 614.

In one example, the streaming client receives the stream sent from the streaming server at the Wi-Fi module 602, including the 2D+Z content and the meta-data included in the SDP information. The RTSP/RTP filter 604 receives the content from the Wi-Fi module 601 and routes it to the decode filter 608, so that the decode filter 608 may decode the content and provide the decoded content to the MMS-3D filter 610. Here, the MMS-3D filter 610 may utilize the SDP information to separate the video and depth portions from the decoded frame, and pass them to the DIBR module 612 as two frames representing the 2D image stream and the corresponding depth information, respectively. The DIBR module 612 utilizes this information to produce a stereoscopic image including a left-view and a right-view frame, which are thereby provided to the 3D display driver 614. The 3D display driver 614 may then render these two views to display a 3D image.

Figure 7:
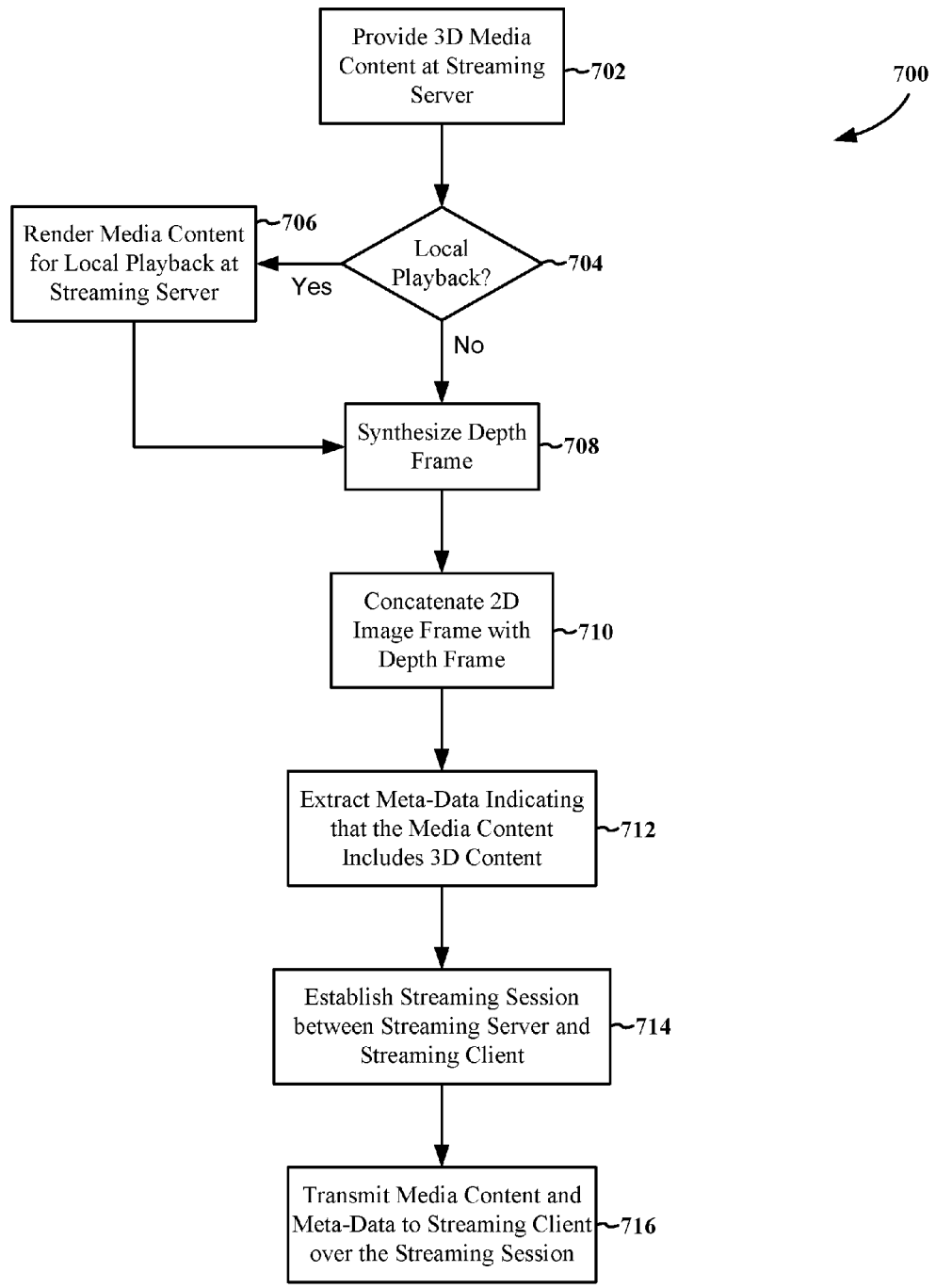
FIG. 7 is a flow chart illustrating a process for streaming media content from a streaming server in accordance with an aspect of the disclosure.

FIG. 7 is a flow chart illustrating a process 700 for streaming media content from a streaming server in accordance with certain aspects of the present disclosure. In various aspects of the present disclosure, the illustrated process may be executed by the processing system 114 illustrated in FIG. 1, the streaming server illustrated in FIGS. 2A and 2B or 4A and 4B, or any suitable apparatus for streaming media content. In the illustrated process, in block 702, 3D media content is provided at the streaming server. Here, the 3D media content may include a stereoscopic image, or a 2D image and corresponding depth frame. In block 704, the process determines whether the streaming server will play back a local copy of the media content. If yes, then in block 706, the streaming server may render media content for local playback. The process then moves to block 708, where, if the 3D media content is stereoscopic content and lacks a depth frame, the process may synthesize a depth frame based on the stereoscopic image. In block 710, the depth frame may be concatenated with a corresponding 2D image. In block 712, the process may extrude meta-data corresponding to the media content, the meta-data indicating that the media content includes 3D content. In block 714, the process establishes a streaming session between the streaming server and the streaming client, and in block 716, the process transmits the media content and associated meta-data to the streaming client over the streaming session.

Figure 8:
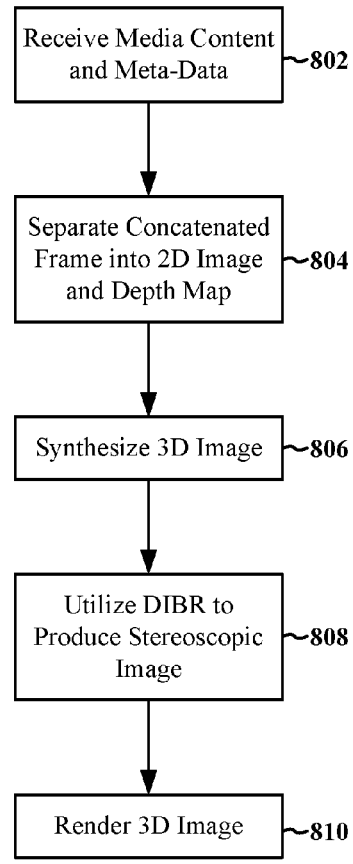
FIG. 8 is a flow chart illustrating a process for wireless communication in accordance with an aspect of the disclosure.

FIG. 8 is a flow chart illustrating a process 800 for wireless communication in accordance with certain aspects of the present disclosure. In various aspects of the present disclosure, the illustrated process may be executed by the processing system 114 illustrated in FIG. 1, the streaming client illustrated in FIG. 2C, 4C, 5, or 6, or any suitable apparatus for receiving media content. In the illustrated process, in block 802, the streaming client may receive media content and associated meta-data from a streaming server over a wireless streaming session, the media content including a 2D image and a corresponding depth map. In block 804, the process may separate the concatenated image+depth frame into a separate 2D image and corresponding depth map. In block 806, the process synthesizes a 3D image based on the 2D image and the depth map. In block 808, the process may utilize depth information based rendering to produce a stereoscopic image representing the 3D image, and in block 810, the process may render the 3D image.

Referring now to FIG. 1, FIGS. 2A-2B, and FIGS. 4A-4B, in one configuration, the apparatus 100 for streaming media content from a streaming server may include means for providing three-dimensional (3D) media content at the streaming server; means for establishing a streaming session between the streaming server and a streaming client; means for transmitting the media content to the streaming client over the streaming session, for remote rendering and display of a 3D image; means for rendering the media content for local playback at the streaming server; means for rendering a two-dimensional (2D) image based on the 3D media content; means for extracting information about the media content, adapted to indicate that the media content comprises 3D content; means for transmitting the information about the media content to the streaming client over the streaming session; means for providing an information element in a session description protocol (SDP) description of the media content; means for synthesizing the depth frame from the 2D image frame; means for synthesizing the depth frame from a pair of 2D images representing a stereoscopic image; and/or means for utilizing one of the pair of 2D images as the 2D image frame. In some aspects of the disclosure, the aforementioned means may be the processing system 114 configured to perform the functions recited by the aforementioned means. As described supra, the processing system 114 can include the video source 202/402, the depth estimator 204/404, the file source 208/410/422, the file parsing module 210/412/424, the video tap out 212/414/424, the video decoder 214/416, the video renderer 216/418, and/or the outgoing video stream block 218/420/426. As such, in one configuration, the aforementioned means may be the video source 202/402, the depth estimator 204/404, the file source 208/410/422, the file parsing module 210/412/424, the video tap out 212/414/424, the video decoder 214/416, the video renderer 216/418, and/or the outgoing video stream block 218/420/426 configured to perform the functions recited by the aforementioned means.

Referring now to FIG. 1, FIG. 2C, FIG. 4C, and FIG. 6, in another configuration, the apparatus 100 for wireless communication may include means for receiving media content from a streaming server over a wireless streaming session, the media content including a two-dimensional (2D) image and a corresponding depth map; means for synthesizing a three-dimensional (3D) image based on the 2D image and the depth map; means for rendering the 3D image on a display means for receiving information about the media content from the streaming server; means for separating the concatenated frame into the 2D image and the corresponding depth map; and/or means for utilizing depth information based rendering (DIBR) to produce a stereoscopic image representing the 3D image. In some aspects of the disclosure, the aforementioned means may be the processing system 114 configured to perform the functions recited by the aforementioned means. As described supra, the processing system 114 can include the media player 602, the video decoder 222/430/440, the 2D and depth frames extractor 224, the 2D frame processor 432, the depth frame processor 442, the 3D view synthesizer 226/434, the 3D display 436, the WiFi 604, the filter 606, the decode filter 608, the MMS-3D filter 610, the DIBR module 612, and/or the 3D display driver 614. As such, in one configuration, the aforementioned means may be the media player 602, the video decoder 222/430/440, the 2D and depth frames extractor 224, the 2D frame processor 432, the depth frame processor 442, the 3D view synthesizer 226/434, the 3D display 436, the WiFi 604, the filter 606, the decode filter 608, the MMS-3D filter 610, the DIBR module 612, and/or the 3D display driver 614 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of streaming media content from a streaming server, comprising:
   providing three-dimensional (3D) media content at the streaming server, wherein the 3D media content at least includes a two-dimensional (2D) image and a depth map corresponding to the 2D image;
   establishing a streaming session between the streaming server and a streaming client;
   compressing the 2D image into a first stream using first encoding options;
   compressing the depth map into a second stream using second encoding options different from the first encoding options; and
   transmitting the compressed 2D image in the first stream and the compressed depth map in the second stream to the streaming client over the streaming session, for remote rendering and display of a 3D image,
   wherein the streaming session comprises a real time streaming protocol (RTSP) session, and wherein the compressed 2D image in the first stream and the compressed depth map in the second stream are streamed on different real-time transport protocol (RTP) ports of the same RTSP session.

2. The method of claim 1, further comprising rendering the media content for local playback at the streaming server.

3. The method of claim 2, wherein the rendering comprises rendering the 2D image based on the 3D media content.

4. The method of claim 1, further comprising extracting information about the media content, adapted to indicate that the media content comprises 3D content.

5. The method of claim 4, wherein the information comprises meta-data associated with the media content.

6. The method of claim 4, further comprising transmitting the information about the media content to the streaming client over the streaming session.

7. The method of claim 6, wherein the transmitting of the information about the media content comprises providing an information element in a session description protocol (SDP) description of the media content.

8. The method of claim 1, further comprising synthesizing the depth map from the 2D image frame.

9. The method of claim 1, further comprising:
   synthesizing the depth map from a pair of 2D images representing a stereoscopic image; and
   utilizing one image of the pair of 2D images as the 2D image.

10. A streaming server, comprising:
    a file parser configured to extract 3D media content from a content source, wherein the 3D media content at least includes a two-dimensional (2D) image and a depth map corresponding to the 2D image;
    a multimedia messaging services module configured to establish a streaming session with a streaming client;
    a depth estimator configured to compress the 2D image into a first stream using first encoding options and to compress the depth map into a second stream using second encoding options different from the first encoding options; and a wireless transmitter configured to stream the compressed 2D image in a first stream and the compressed depth map in a second stream to the streaming client over the streaming session, wherein the multimedia messaging services module is configured to establish a real time streaming protocol (RTSP) session with the streaming client, and wherein the wireless transmitter is configured to stream the compressed 2D image in the first stream and the compressed depth map in the second stream on different real-time transport protocol (RTP) ports of the same RTSP session.

11. The streaming server of claim 10, further comprising a memory, wherein the content source comprises the memory.

12. The streaming server of claim 10, wherein the file parser is further configured to extract meta-data corresponding to the 3D media content from the content source.

13. The streaming server of claim 12, wherein the multimedia messaging services module is further configured to send the meta-data to the streaming client over the streaming session.

14. The streaming server of claim 10, further comprising:
a display device; and
a tap-out module configured to branch the 3D media content to the display device.

15. A method of wireless communication, comprising:
receiving media content at a streaming client from a streaming server over a wireless streaming session, wherein the media content comprises a two-dimensional (2D) image stream and a separate corresponding depth map stream, wherein a 2D image and a corresponding depth map are separately and respectively compressed into the 2D image stream and depth map stream using different encoding options,
wherein the wireless streaming session comprises a real time streaming protocol (RTSP) session, and wherein the compressed 2D image stream and the compressed depth map stream are received on different real-time transport protocol (RTP) ports of the same RTSP session;
synthesizing a three-dimensional (3D) image based on the 2D image stream and the depth map stream; and
rendering the 3D image on a display.

16. The method of claim 15, further comprising receiving information about the media content from the streaming server.

17. The method of claim 16, wherein the information comprises meta-data adapted to indicate that the media content comprises 3D content.

18. The method of claim 15, wherein the synthesizing comprises utilizing depth information based rendering (DIBR) to produce a stereoscopic image representing the 3D image.

19. A streaming client, comprising:
a wireless receiver configured to receive three-dimensional (3D) media content from a streaming server, wherein the 3D media content comprises a two-dimensional (2D) image stream and a separate corresponding depth map stream, wherein a 2D image and a corresponding depth map are separately and respectively compressed into the 2D image stream and the depth map stream using different encoding options, wherein the wireless streaming session comprises a real time streaming protocol (RTSP) session, and wherein the wireless receiver is configured to receive the compressed 2D image stream and the compressed depth map stream on different real-time transport protocol (RTP) ports of the same RTSP session;
a depth image based rendering (DIBR) module for generating a stereoscopic image that includes a left view and a right view based on the 2D image stream and the corresponding depth map stream; and
a display driver for rendering the stereoscopic image on a display.

20. An apparatus for streaming media content from a streaming server, comprising:
means for providing three-dimensional (3D) media content at the streaming server, wherein the 3D media content at least includes a two-dimensional (2D) image and a depth map corresponding to the 2D image;
means for establishing a streaming session between the streaming server and a streaming client;
means for compressing the 2D image into a first stream using first encoding options and for compressing the depth map into a second stream using second encoding options different from the first encoding options; and
means for transmitting the compressed 2D image in the first stream and the compressed depth map in the second stream to the streaming client over the streaming session, for remote rendering and display of a 3D image,
wherein the streaming session comprises a real time streaming protocol (RTSP) session, and wherein the compressed 2D image in the first stream and the compressed depth map in the second stream are streamed on different real-time transport protocol (RTP) ports of the same RTSP session.

21. The apparatus of claim 20, further comprising means for rendering the media content for local playback at the streaming server.

22. The apparatus of claim 21, wherein the means for rendering comprises means for rendering the 2D image based on the 3D media content.

23. The apparatus of claim 20, further comprising means for extracting information about the media content, adapted to indicate that the media content comprises 3D content.

24. The apparatus of claim 23, wherein the information comprises meta-data associated with the media content.

25. The apparatus of claim 23, further comprising means for transmitting the information about the media content to the streaming client over the streaming session.

26. The apparatus of claim 25, wherein the means for transmitting the information about the media content comprises means for providing an information element in a session description protocol (SDP) description of the media content.

27. The apparatus of claim 20, further comprising means for synthesizing the depth map from the 2D image frame.

28. The apparatus of claim 20, further comprising:
means for synthesizing the depth map from a pair of 2D images representing a stereoscopic image; and
means for utilizing one of the pair of 2D images as the 2D image frame.

29. An apparatus for wireless communication, comprising:
means for receiving media content at a streaming client from a streaming server over a wireless streaming session, wherein the media content comprises a two-dimensional (2D) image stream and a separate corresponding depth map stream, wherein a 2D image and a corresponding depth map are separately and respectively compressed into the 2D image stream and the depth map stream using different encoding options, wherein the wireless streaming session comprises a real time streaming protocol (RTSP) session, and wherein the means for receiving is for receiving the compressed 2D image stream and the compressed depth map stream on different real-time transport protocol (RTP) ports of the same RTSP session;

means for synthesizing a three-dimensional (3D) image based on the 2D image stream and the depth map stream; and means for rendering the 3D image on a display.

30. The apparatus of claim 29, further comprising means for receiving information about the media content from the streaming server.

31. The apparatus of claim 30, wherein the information comprises meta-data adapted to indicate that the media content comprises 3D content.

32. The apparatus of claim 29, wherein the means for synthesizing comprises means for utilizing depth information based rendering (DIBR) to produce a stereoscopic image representing the 3D image.

33. A non-transitory computer-readable medium storing computer executable code comprising:
    code for providing three-dimensional (3D) media content at a streaming server, wherein the 3D media content at least includes a two-dimensional (2D) image and a depth map corresponding to the 2D image;
    code for establishing a streaming session between the streaming server and a streaming client;
    code for compressing the 2D image into a first stream using first encoding options;
    code for compressing the depth map into a second stream using second encoding options different from the first encoding options; and
    code for transmitting the compressed 2D image in the first stream and the compressed depth map in the second stream to the streaming client over the streaming session, for remote rendering and display of a 3D image,
    wherein the streaming session comprises a real time streaming protocol (RTSP) session, and wherein the compressed 2D image in the first stream and the compressed depth map in the second stream are streamed on different real-time transport protocol (RTP) ports of the same RTSP session.

34. The computer-readable medium of claim 33, further comprising code for rendering the media content for local playback at the streaming server.

35. The computer-readable medium of claim 34, wherein the code for rendering comprises code for rendering the 2D image based on the 3D media content.

36. The computer-readable medium of claim 33, further comprising code for extracting information about the media content, adapted to indicate that the media content comprises 3D content.

37. The computer-readable medium of claim 36, wherein the information comprises meta-data associated with the media content.

38. The computer-readable medium of claim 36, further comprising code for transmitting the information about the media content to the streaming client over the streaming session.

39. The computer-readable medium of claim 38, wherein the code for transmitting the information about the media content comprises code for providing an information element in a session description protocol (SDP) description of the media content.

40. The computer-readable medium of claim 33, further comprising code for synthesizing the depth map from the 2D image.

41. The computer-readable medium of claim 33, further comprising:
    code for synthesizing the depth map from a pair of 2D images representing a stereoscopic image; and
    code for utilizing one of the pair of 2D images as the 2D image.

42. A non-transitory computer-readable medium storing computer executable code, comprising:
    code for receiving media content at a streaming client from a streaming server over a wireless streaming session, wherein the media content comprises a two-dimensional (2D) image stream and a corresponding depth map stream, wherein a 2D image and a corresponding depth map are separately and respectively compressed into the 2D image stream and the depth map stream using different encoding options, wherein the wireless streaming session comprises a real time streaming protocol (RTSP) session, and wherein the code for receiving includes code for receiving the compressed 2D image stream and the compressed depth map stream on different real-time transport protocol (RTP) ports of the same RTSP session;
    code for synthesizing a three-dimensional (3D) image based on the 2D image stream and the depth map stream; and
    code for rendering the 3D image on a display.

43. The computer-readable medium of claim 42, further comprising code for receiving information about the media content from the streaming server.

44. The computer-readable medium of claim 43, wherein the information comprises meta-data adapted to indicate that the media content comprises 3D content.

45. The computer-readable medium of claim 42, wherein the code for synthesizing comprises code for utilizing depth information based rendering (DIBR) to produce a stereoscopic image representing the 3D image.

46. An apparatus for streaming media content from a streaming server, comprising:
    a processor and a memory coupled to the processor, wherein the processor is configured to:
        provide three-dimensional (3D) media content at the streaming server, wherein the 3D media content at least includes a two-dimensional (2D) image and a depth map corresponding to the 2D image;
        establish a streaming session between the streaming server and a streaming client;
        compress the 2D image into a first stream using first encoding options;
        compress the depth map into a second stream using second encoding options different from the first encoding options; and
        transmit the compressed 2D image in the first stream and the compressed depth map in the second stream to the streaming client over the streaming session, for remote rendering and display of a 3D image,
        wherein the streaming session comprises a real time streaming protocol (RTSP) session, and wherein the compressed 2D image in the first stream and the compressed depth map in the second stream are streamed on different real-time transport protocol (RTP) ports of the same RTSP session.

47. The apparatus of claim 46, wherein the processing system is further configured to render the media content for local playback at the streaming server.

48. The apparatus of claim 47, wherein the rendering comprises rendering the 2D image based on the 3D media content.

49. The apparatus of claim 46, wherein the processing system is further configured to extract information about the media content, adapted to indicate that the media content comprises 3D content.

50. The apparatus of claim 49, wherein the information comprises meta-data associated with the media content.

51. The apparatus of claim 49, wherein the processing system is further configured to transmit the information about the media content to the streaming client over the streaming session.

52. The apparatus of claim 51, wherein the transmitting of the information about the media content comprises providing an information element in a session description protocol (SDP) description of the media content.

53. The apparatus of claim 46, wherein the processing system is further configured to synthesize the depth map from the 2D image.

54. The apparatus of claim 46, wherein the processing system is further configured to
synthesize the depth map from a pair of 2D images representing a stereoscopic image; and
utilize one of the pair of 2D images as the 2D image.

55. An apparatus for wireless communication, comprising:
a processor and a memory coupled to the processor, wherein the processor is configured to:
receive media content at a streaming client from a streaming server over a wireless streaming session, wherein the media content comprises a two-dimensional (2D) image stream and a separate corresponding depth map stream, wherein a 2D image and a corresponding depth map are separately and respectively compressed into the 2D image stream and the depth map stream using different encoding options, wherein the wireless streaming session comprises a real time streaming protocol (RTSP) session, and
wherein the code for receiving includes code for receiving the compressed 2D image stream and the compressed depth map stream on different real-time transport protocol (RTP) ports of the same RTSP session;
synthesize a three-dimensional (3D) image based on the 2D image stream and the depth map stream; and
render the 3D image on a display.

56. The apparatus of claim 55, wherein the wireless streaming session comprises a real time streaming protocol (RTSP) session and the compressed 2D image stream and the compressed depth map stream are received on different real-time transport protocol (RTP) ports of the same RTSP session.

57. The apparatus of claim 55, wherein the processor is further configured to receive information about the media content from the streaming server.

58. The apparatus of claim 57, wherein the information comprises meta-data adapted to indicate that the media content comprises 3D content.

59. The apparatus of claim 55, wherein the synthesizing comprises utilizing depth information based rendering (DIBR) to produce a stereoscopic image representing the 3D image.

60. The method of claim 1, wherein the streaming server is a mobile device.

61. The method of claim 1, further comprising:
extracting a stereoscopic image that includes a left view and a right view from the 3D media content; and
generating the 2D image and the depth map based on the stereoscopic image.

62. The method of claim 1, wherein compressing the depth map into a second stream using second encoding options different from the first encoding options comprises increasing the QP value for the chroma component of the depth map, and inserting an Intra (I) frame at regular intervals utilizing H.264 encoding.

* * * * *